United States Patent [19]

Davene et al.

[11] Patent Number: 5,466,309
[45] Date of Patent: Nov. 14, 1995

[54] METAL STRIP TREATMENT INSTALLATION

[75] Inventors: Jean Davene, Marly le Roi; Sylvie Rachenne, Paris; Jean-Jacques Douvry, Neuilly Sur Seine, all of France

[73] Assignee: Clecim, Cergy Pontoise Cedex, France

[21] Appl. No.: 194,056

[22] Filed: Feb. 9, 1994

[30] Foreign Application Priority Data

Feb. 12, 1993 [FR] France ................................ 93 01623
Feb. 12, 1993 [FR] France ................................ 93 01624

[51] Int. Cl.$^6$ ........................................................ C23G 3/02
[52] U.S. Cl. ........................ 148/508; 134/10; 266/112
[58] Field of Search ........................ 260/44, 112, 120, 260/130, 131; 148/508; 134/10

[56] References Cited

U.S. PATENT DOCUMENTS

| | | | |
|---|---|---|---|
| 1,544,506 | 6/1925 | Tytus | 266/112 |
| 2,314,369 | 3/1943 | Reed | 266/112 |
| 3,445,284 | 5/1969 | Robinson, Jr. et al. | 134/10 |
| 4,325,746 | 4/1982 | Popplewell et al. | 134/10 |

FOREIGN PATENT DOCUMENTS 225273  6/1987  European Pat. Off. .

OTHER PUBLICATIONS

Abstracts, vol. 9, No. 34 (M–357) 1757 Feb. 14, 1985.
EPO JP53118258 (Patent Abstracts of Japan) Jul. 1982.
EPO JP57109502 (Patent Abstracts of Japan) Jul. 1982.
EPO JP57188683 (Patent Abstracts of Japan) Nov. 1982.
EPO JP57081915 (Patent Abstracts of Japan) May 1982.
EPO JP58136800 (Patent Abstracts of Japan) Aug. 1983.
"La Ligne de Decapage de Sollac Sainte Agathe. Premiers Resultats d'Exploitation" by Lauth et al, Jul. 1987.

*Primary Examiner*—Scott Kastler
*Attorney, Agent, or Firm*—Pollock, Vande Sande & Priddy

[57] ABSTRACT

An installation for treating metal strip comprising a pickling line made up of a series of tanks filled with a pickling solution heated to a certain temperature, and through which the metal strip is successively passed before passing into a cold rolling mill, each tank being associated with an arrangement for adjusting the temperature of the solution in the tank, according to its position in the line. The installation comprises at least one complementary heating arrangement associated with a regulation system for maintaining the solution at the desired temperature according to variations in overall energy conditions, and comprising a heat pump for recovering at least part of the heat needed from a cooking circuit of the cold rolling mill.

19 Claims, 5 Drawing Sheets

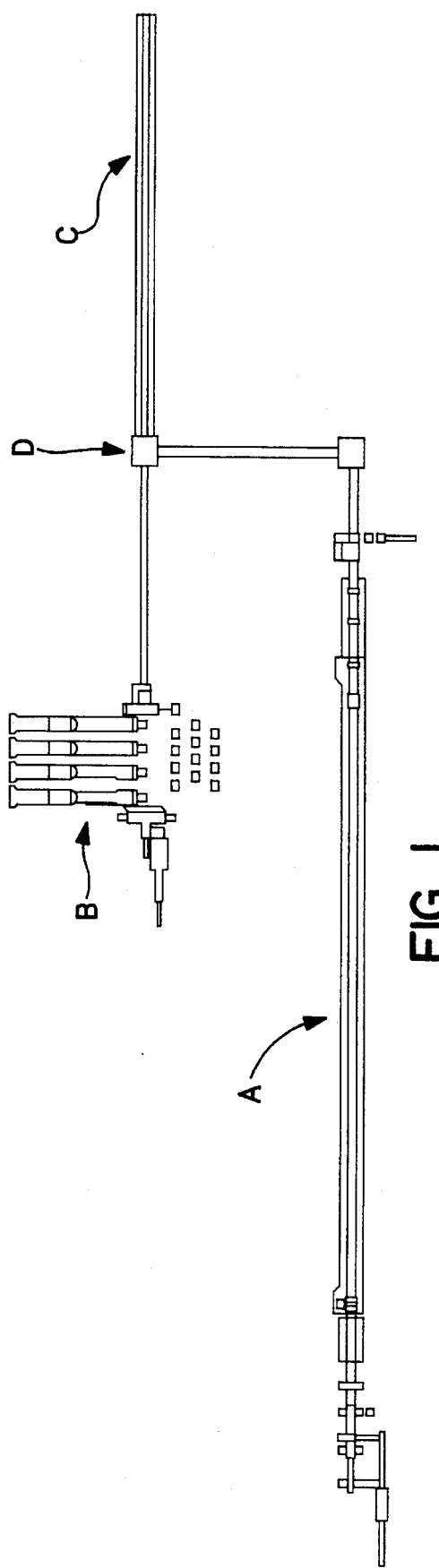
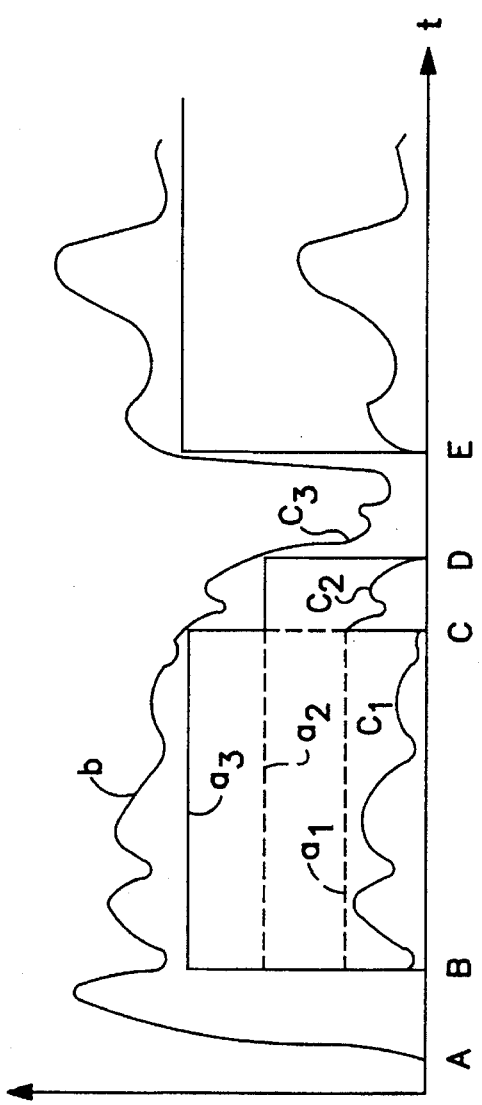
FIG. 1
FIG. 3

5,466,309

METAL STRIP TREATMENT INSTALLATION

BACKGROUND OF THE INVENTION

1. Field of the Invention

The object of the invention is improvements to metal strip treatment installations.

2. Background of the Invention

The production of strips or sheets of steel or any other metal for widely differing uses usually involves hot rolling after which the rolled strip is subjected to various mechanical, chemical or heat treatments, depending on the type of product to be produced; these treatments normally include pickling followed by cold rolling.

Pickling is necessary in order to remove the oxide coating that forms on the two faces of the strip during hot rolling and storage. Pickling is performed in continuous fashion by passing the strip successively through a series of tanks containing a pickling solution, for example, hydrochloric or sulfuric acid.

The pickling tanks are arranged in sequence and are separated from each other by a threshold, comprising, for example, a deflector roller, placed above the level of the bath, the strip thus following an undulating path, dipping into successive tanks. Drying rollers are installed where the strip leaves the last tank to prevent acid from being pulled along with the strip into the next part of the installation. Rollers or other devices forming a threshold are also placed between two successive tanks to support the strip and prevent the solution from being pulled into the following tank.

After leaving the last pickling tank, the strip passes into a rinsing tank equipped with a system for pumping and spraying rinsing liquid, followed by a system for drying the liquid remaining on the two sides of the strip by evaporation.

Cold rolling is then performed in a rolling mill comprising several stands operating in tandem. Each stand comprises a series of rolls, for example, two live rolls between which the strip passes, and which bear upon two rolls of larger diameter.

Since the solution becomes charged with oxides as pickling progresses, the pickling solution is normally passed from one tank to another in the direction opposite to that of the strip, such that the last pickling tank is fed with fresh or recycled solution, whereas the first pickling tank is connected to a pipe for evacuating the used acid solution which has successively passed through all the tanks.

The optimum acid concentration therefore depends on the position of the tank in the line, and for this reason each tank is generally connected, via a recycling circuit, to a storage tank in which the concentration of the acid can be adjusted to the desired level.

However, the temperature of the solution also tends to vary from one tank to the next since the strip enters the first tank at ambient temperature, i.e., 10° to 25° C., and heats up in contact with the solution.

There is therefore, at least in the first tank, an exchange of heat between the strip which heats up and the solution which, in contrast, tends to cool down.

Moreover, heat losses due to evaporation and radiation occur in all the tanks; plus, in the last tank, additional heat losses occur as a result of the addition of fresh cold solution.

The most favorable conditions for the pickling operation exist when the temperature of the strip and of the solution is in the order of 75° to 85° C., the optimal temperature depending, moreover, on the concentration and consequently the position of the tank.

Therefore, the solution in each of the tanks is to be reheated in order to raise and maintain it at the desired pickling temperature, taking account of the position of the tank and compensating for heat losses.

For this reason, each tank is normally associated with one or more reheating circuits connected to the storage tank from where some of the solution is taken and reinjected, after filtering and reheating, at the correct temperature. The concentration can be adjusted either on the reheating circuit or directly in the tank.

Each reheating circuit therefore comprises a circulation pump and a reheating device. This reheating device could be, e.g., a heat exchanger heated by circulation of a heat transfer fluid such as steam, or alternatively by heating elements such as electric elements.

The rinsing liquid is generally also heated and its temperature maintained in similar fashion.

This reheating of the solution consumes a large amount of energy and is therefore expensive.

Moreover, this consumption of energy is irregular in that it depends on production. Indeed, since the chemical effect of the solution is exerted on the surface of the strip, the speed of travel is normally calculated so as to give the immersion time and, thence, the pickling effect required, taking account of the length of the tanks in the installation and the properties and temperature of the pickling solution.

However, the amount of heat absorbed by the strip depends on its mass and, consequently, its thickness. The greater the thickness of the strip, the greater the heat losses, which must result in a fall in temperature and, therefore, a fall in the efficiency of the pickling process which requires that the strip be slowed down, or higher consumption of energy in order to compensate for losses and maintain the solution at the desired temperature.

The invention offers solutions to such problems using particularly simple arrangements which make it possible to reduce overall consumption of energy and to very flexibly adapt the supply of energy to variations in requirements resulting notably from changes in production conditions.

In additions, for a given speed of travel, the invention makes it possible to reduce the pickling length and, consequently, the number of tanks, or alternatively, for a given pickling length, the invention makes it possible to improve productivity.

The invention can be applied either to new installations, thereby reducing their overall dimensions, or to existing installations, thereby improving their performance.

SUMMARY OF THE INVENTION

The invention generally concerns a metal strip treatment installation comprising a cold rolling mill including at least one rolling stand comprising a plurality of rolls and means for spraying rolling fluid onto the rolls and strip, and a pickling line made up of a series of tanks through which the metal strip is continuously passed, the tanks being filled with a pickling solution and associated with means for heating such solution.

According to the invention, the installation comprises means associated with each tank for adjusting the temperature of the solution to the desired level in the tank under consideration according to its position in the line, and at least one complementary heating means associated with a regulation system acting on the adjustment means in each tank and on the at least one complementary heating means for maintaining the solution at the desired temperature in each tank, by adjusting the level of energy supplied by the complementary heating means, according to variations in overall energy requirements resulting from changes in production conditions.

According to a first preferred embodiment, the complementary heating means is a heating device of the heat pump type comprising a known closed circuit containing refrigerating fluid which passes through an evaporator, at least one compressor, at least one condenser and a pressure-relief valve, the evaporator being connected to a circuit for circulating rolling fluid recovered at the outlet of the rolling mill in order to cool the rolling fluid by heat exchange with the refrigerating fluid.

Preferably, each adjustment means associated with each tank is a heat exchanger connected to a circuit for circulating the solution contained in the tank under consideration, and to a circuit for circulating a heat exchanging fluid which passes via the heat pump in which the heat exchanging fluid is heated.

According to a first advantageous embodiment, the heat exchanging fluid circulates in a circuit comprising a feed collector connected to the outlet of the condenser of the heat pump, and a return collector connected to the inlet of the condenser. Each exchanger is connected via inlet and outlet pipes, respectively, to the feed collector and to the return collector of the heat exchanging fluid circuit, the flow rate of the heat exchanging fluid in each exchanger being adjustable by means of a valve.

In addition, an exchanger constituting a supplementary heating means is connected to the feed collector of the heat exchanging fluid circuit.

According to a second embodiment, the heat exchanging fluid for heating the solution is the refrigerating fluid of the heat pump, each exchanger being associated with each tank for the reheating of the solution and constituting a condenser of the heat pump with an inlet and an outlet connected, respectively, to a refrigerating fluid feed collector and to a return collector connected respectively to the outlet of the compressor and to the input of the heat pump's pressure-relief valve.

In this case, each tank is associated with a second reheating circuit comprising a heat exchanger fitted with adjustable heating means.

The invention also covers a process for heating and maintaining the temperature of a pickling solution in an installation comprising a metal strip pickling line made up of a series of tanks filled with pickling solution and a cold rolling mill, and in which the metal strip is continuously passed successively through each tank and then through the rolling mill.

In accordance with the invention, after the solution has been heated to the pickling temperature and the installation started up and running in stable operating conditions, the solution in each tank is maintained at the correct temperature by an association of two complementary heating means. These are, respectively, a heat pump supplying a relatively stable energy level and a second heating means supplying an additional energy level that can be permanently adjusted in order to adapt, at all times, to variations in overall energy requirements resulting from changes in production conditions. The rolling emulsion is cooled simultaneously by the heat pump and by an additional cooling means allowing the temperature of the emulsion to be reduced to the desired level before being recycled.

The general heating system has a number of particular features which are also the object of claims.

In particular, the installation comprises a regulation system which, during a given production cycle comprising continuous changes in operating conditions, allows the energy supplied by the two heating means to be adapted at each instant to requirements.

To reduce overall energy consumption even further, the installation can advantageously include a means for heating the entire strip by electromagnetic induction, this means being placed immediately before the strip passes into the first tank and comprising at least one inductor of the axial flux type, placed on the path of the strip upstream of the first pickling tank in relation to the direction of travel, the inductor extending across the entire width of the strip and on either side of the strip.

The regulation system is associated with means for adjusting the electricity supply to the inductors according to the different parameters considered for heating the strip, such as speed of travel, thickness and width of the strip, ambient temperature, temperature of the strip at the outlet of the preheating means and the temperature of the solution in the first pickling tank.

According to another particularly advantageous embodiment, the invention also makes it possible to reduce the amount of oxide and impurities deposited on the strip before it enters the tanks, and consequently to improve pickling efficiency for the same energy consumption.

To this end, the installation comprises at least one inductor assembly of the axial flux type, placed on the path of the strip upstream of the first pickling tank, and adjusted in such a way as to cause the strip to vibrate as it passes, thus causing at least some of the impurities deposited on the strip to become detached.

The heating means contained in the reheating circuit associated with each pickling tank may be sufficient only to maintain the solution at the desired temperature in the tank under consideration. In this case, the installation comprises a means for preliminary heating of the solution, thereby raising it to the desired temperaturen in all tanks.

This means is advantageously an exchanger comprising electrical resistances sunk in a block of corrosion-resistant material, such a graphite, and in which circulation pipes are made through which the solution to be heated can flow.

BRIEF DESCRIPTION OF THE DRAWINGS

The invention will however be better understood from the following description of a number of embodiments of the invention, which should be read in conjunction with the attached drawings. In these drawings:

FIG. 1 is a schematic view of the first part of a treatment installation comprising a pickling line and tandem rolling mill.

FIG. 3 is a diagram showing the thermal power supplied by the different components to adapt to variations in production.

Figure 2:
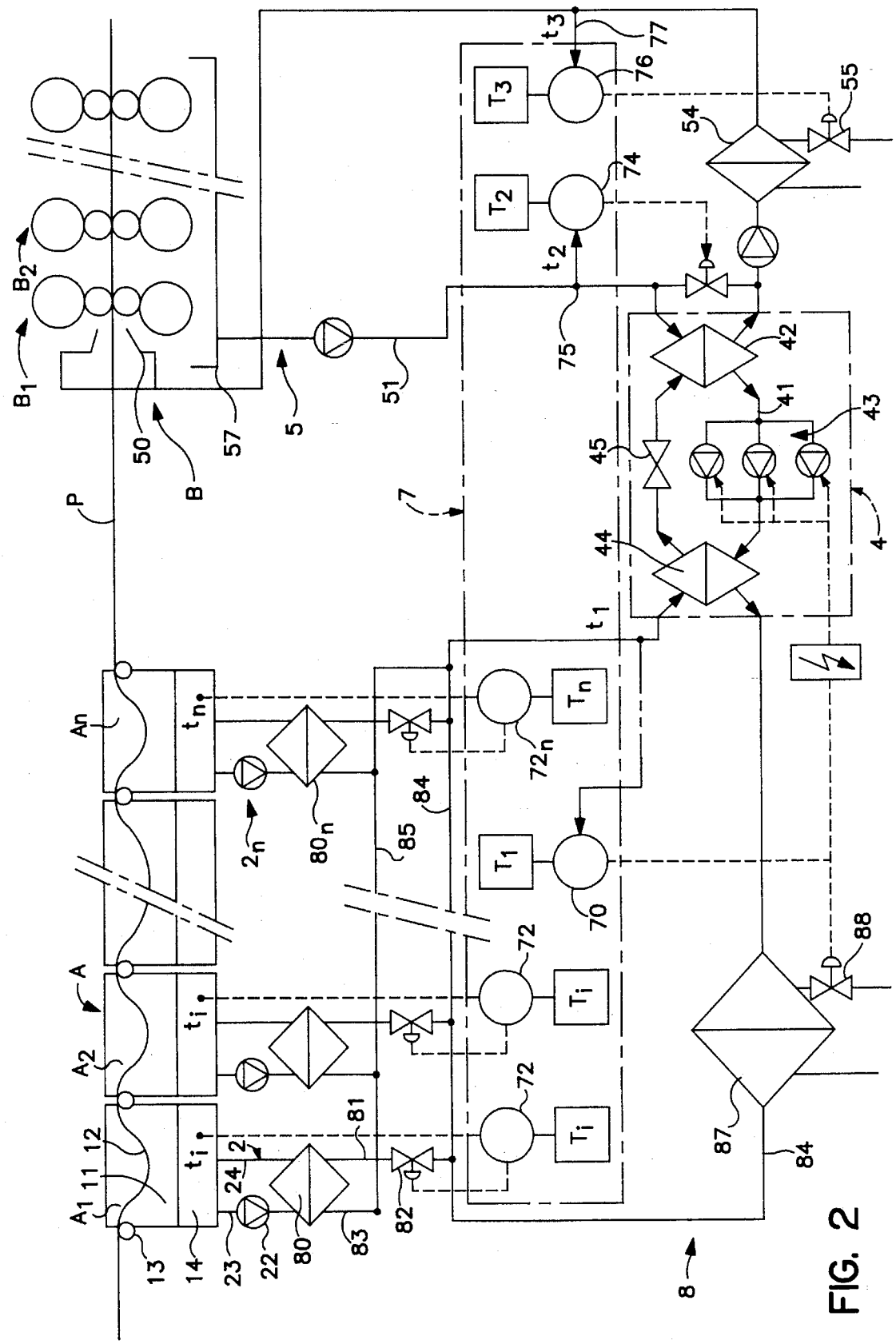
FIG. 2 schematically shows the coupling of a pickling line with a tandem rolling mill for the heating of the solution according to a first embodiment of the invention.
Figure 4:
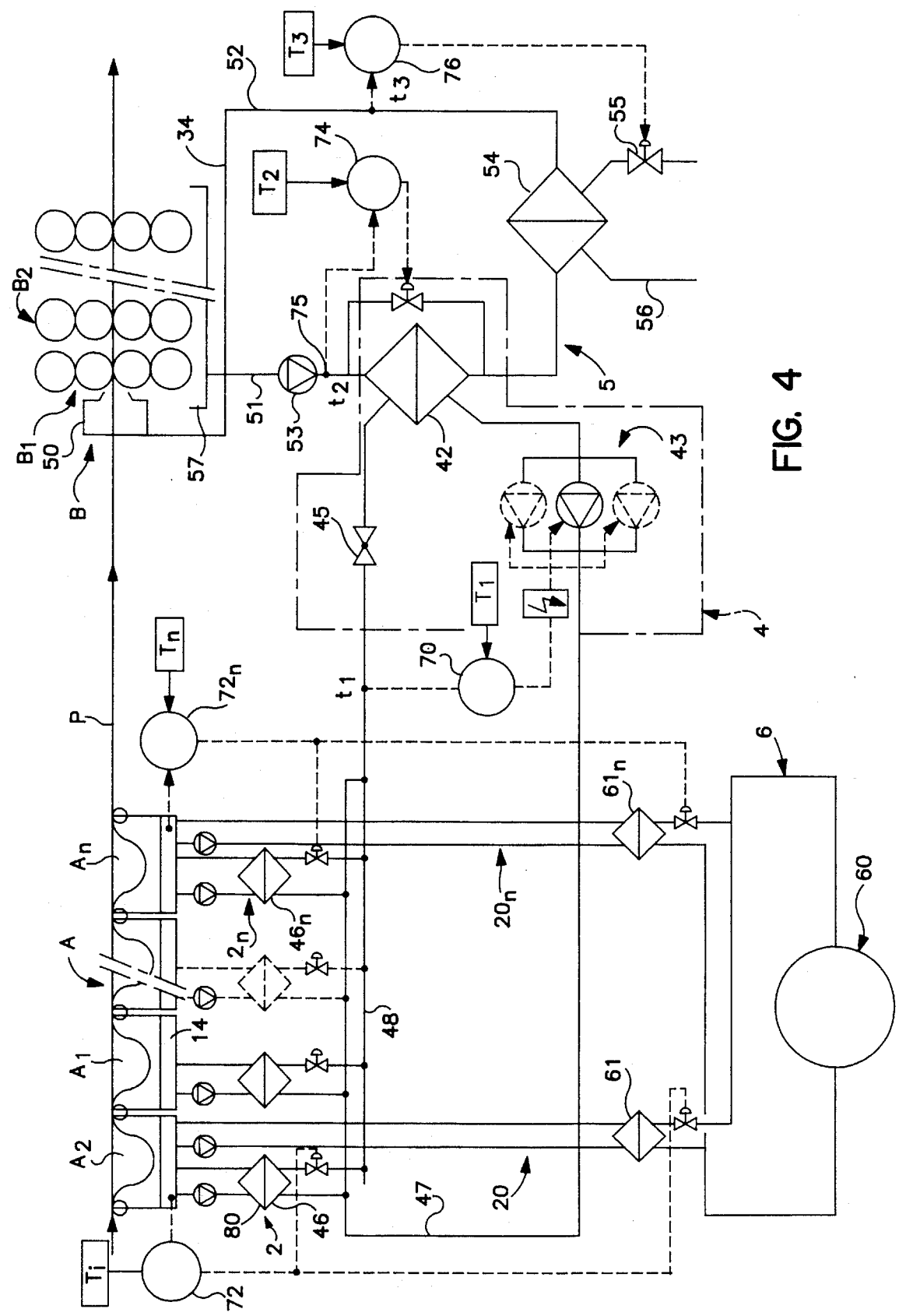

The diagram shown in FIG. 4, similar to that shown in FIG. 2, shows a second embodiment of the invention.

Figure 5:
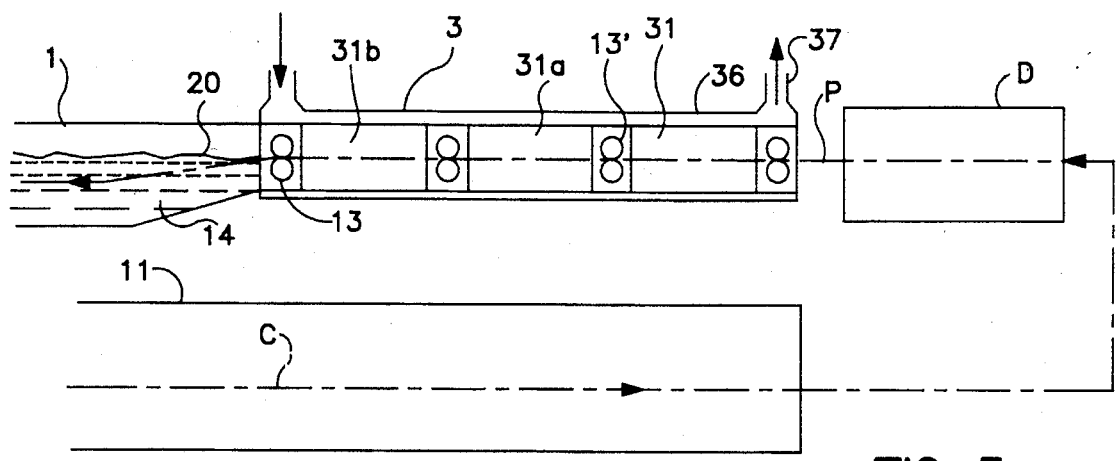

FIG. 5 schematically shows the arrangement of a preheating means placed on the upside of a pickling installation.

Figure 6:
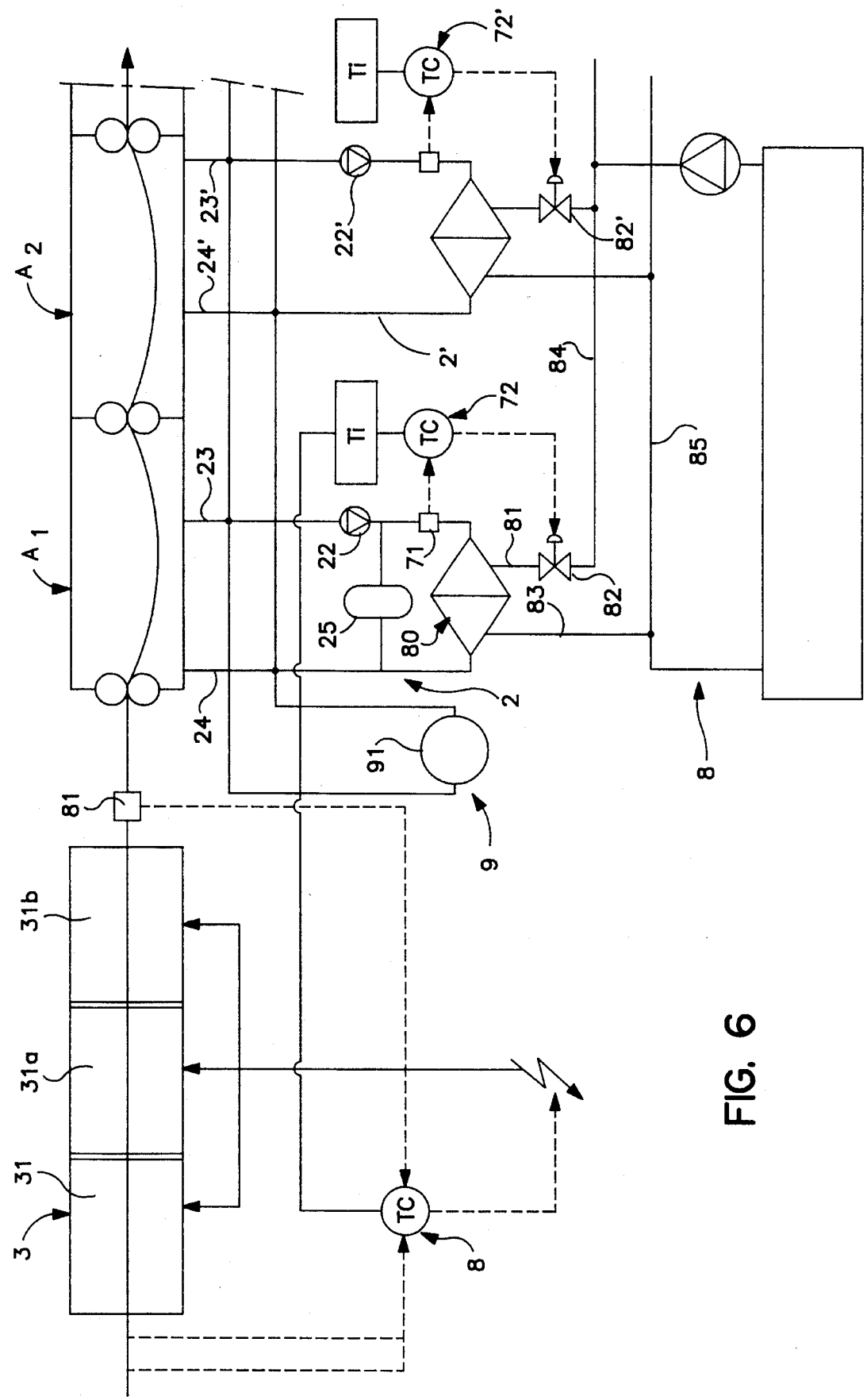

FIG. 6 schematically shows the method for coupling the preheating means of the invention to a pickling installation.

Figure 7:

FIG. 7 is a cross-sectional transverse view of an inductor.

Figure 8:
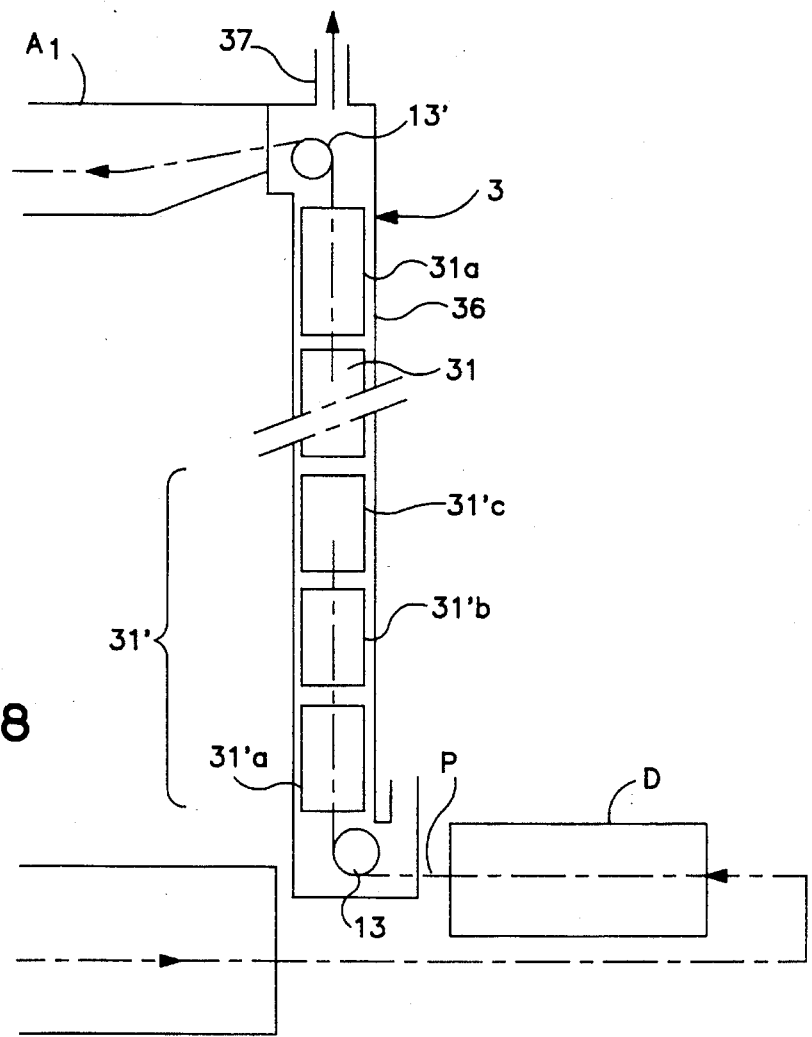

FIG. 8 schematically shows a further embodiment of the invention in which the strip is made to vibrate.

DESCRIPTION OF THE PREFERRED EMBODIMENTS

It is known that a metal strip treating installation for the production of different kinds of finished or semi-finished parts such as coils, tubes, sheets, etc., comprises several lines allowing various mechanical, thermal or chemical treatments to be carried out such as continuous annealing, degreasing, planing, shearing and galvanization. These different treatments are generally preceded by a passage through a pickling line and cold rolling mill.

FIG. 1 shows the first part of such an installation comprising a pickling line A, a tandem rolling mill B and accumulators C. The sheet to be pickled normally arrives from the hot rolling mill in the form of coils which are unrolled for passing into the different pickling tanks and then the rinsing tanks.

In the past, the strip was recoiled after pickling and each coil transported up to the tandem rolling mill for cold rolling, and these operations were likely to be carried out in different places and at different times.

For some time now, however, these operations are increasingly being carried out in continuous fashion in installations of the type shown in FIG. 1. The sheet is still brought in coil form to the input of the picking installation but, at its outlet, it is sent to the tandem rolling mill in continuous fashion passing via an accumulator; this arrangement makes it possible to absorb changes in the rhythm of production and differences in the speed of travel through the pickling line and tandem rolling mill which are thereby mechanically coupled.

In FIG. 1, rolling mill B is placed next to picking installation A, with the metal strip changing direction in suitable components D. Different arrangements are possible and, for example, changes in direction could be avoided by installing all the machines in one line.

The rolling mill is however located in all cases a relatively short distance from the pickling line, and the two devices are mechanically coupled so as to function simultaneously and at the same speed.

The invention provides a means of making best use of such an arrangement.

Indeed, in a rolling mill, the rolls and metal strip must always be sprayed with a special fluid, generally an emulsion, designed to facilitate rolling by carrying away oxide particles or other impurities from the strip which would otherwise become incrusted in it, but more importantly to regulate the temperature of the cylinders and strip which tends to rise because of the mechanical work carried out.

This rolling fluid must be recovered, filtered and cooled before being recycled.

Still since the rolled strip passes directly and continuously from the pickling line to the rolling line, the availability of and need for energy are simultaneous.

It was subsequently noted that, although the temperature of the rolling fluid is not very high, the particular layout and operating conditions of such an installation could, because of the high flow rates, allow sufficient energy to be recovered from the rolling fluid to ensure simultaneously the cooling of the rolling fluid and the heating of the pickling solution and, possibly, of the rinsing water by using a recovery and heating device of the heat pump type.

Indeed, it happens that the respective temperatures of the pickling solution and rolling fluid are in fact compatible with the current performance specifications for heat pumps.

Moreover, it became clear that the use of such a device in association with other individually adjustable means of heating and cooling would provide a very flexible means of regulating the supply of heat in accordance with production conditions, and would also lead to large energy savings, as will now be shown by reference to two particular examples of adapting a heat pump to a treatment installation.

FIG. 2 is a schematic drawing of the thermal coupling, according to the invention, of a pickling line and cold rolling mill for heating the acid solution by a heat pump and its regulation means.

Pickling line A comprises, as shown, a certain number of tanks $A_1$, $A_2$, . . . $A_n$, each containing a bath 11 of acid solution into which the strip P dips. The strip follows an undulating path 12, passing over deflecting and drying rollers 13 placed respectively upstream and downstream of each tank. These acid tanks are normally followed by a rinsing tank and a drying tank, neither of which have been shown in the drawing for the sake of simplicity.

Tandem rolling mill B, placed downstream of the pickling line in the direction of travel of the strip P, is made up, as is customary, of several associated stands B1, B2, etc., each comprising two working rolls between which the strip P passes and associated with pressure rolls in a Quarto assembly.

Each stand is fitted with ramps 50 for spraying rolling emulsion onto the strip and rolls, the ramps being connected to an emulsion feed circuit 52. The rolling emulsion is collected by means 57 connected to a cooling and recycling circuit 5 comprising a collector 51 supplied by recovery means 57, and an exchanger 54 through which cold water flows and whose outlet is connected to a collector connected to a feed circuit 52 supplying emulsion to the different stands of the tandem rolling mill. The emulsion is pumped through circuit 5 by a pump 53.

The acid solution in each pickling tank must, if possible, be maintained at an optimal temperature and concentration which depend on the advancement of the pickling process and, consequently, on the tank's position in the line.

To this end, each tank, such as tank $A_1$, is associated with a storage tank 14 connected to the tank via a recycling circuit (not shown), and also with means for filtering and adjusting the concentration of the acid solution.

Each tank is also associated with at least one circuit 2 for reheating the solution and maintaining it at the desired temperature.

Each reheating circuit 2 therefore comprises at least one pipe 23 for taking a part of the solution, a circulation pump 22, a heating means 80 and a pipe 24 for recycling the reheated solution.

In the example shown in FIG. 2, each means for heating the acid solution is an exchanger 80 through which flows a heat exchanging fluid such as hot water, introduced via a pipe 81 fitted with a valve 82 for adjusting the flow rate and evacuated via a pipe 83.

The hot water inlet pipe 81 and outlet pipe 83 are connected, respectively, to a feed collector 84 and to an evacuation collector 85 making up two branches of a circulation and water reheating circuit 8.

According to the invention, a large proportion of the heat energy required to reheat the water is supplied by the rolling emulsion thanks to a device 4 of the heat pump type comprising, as is customary, a closed circuit 41 for circulating a refrigerating fluid and on which are placed, in the direction of flow, evaporating means 42, compressing means 43, condensing means 44 and means 45 for expansion of the refrigerating fluid.

A description will now be given of the circulation of the emulsion in circuit 5.

Evaporator 42 of heat pump 4 is branch-connected to rolling emulsion recovery collector 51 upstream of exchanger 54, and can be short-circuited by a by-pass 56 fitted with a valve 57 which therefore allows emulsion to be passed either into evaporator 42 or directly into exchanger 54.

In a similar way, circulation circuit 8 conveying heat exchanging fluid passes via condenser 44 of heat pump 4 whose inlet and outlet are connected, respectively, to evacuation collector 85 and feed collector 84.

In normal operation, the cooling emulsion therefore passes via evaporator 42 and gives up part of its heat to the refrigerating fluid which evaporates, and, after compression by compressor 43, passes into condenser 44 where it condenses and gives up its heat to the water circulating in circuit 8.

The rolling emulsion cools in evaporator 42, although this cooling may be insufficient due to its flow rate. For this reason, supplementary cooling may be provided after the outlet of heat pump 4 by exchanger 54 placed on collector 52 so as to adjust the temperature of the recycled emulsion to the temperature level required for rolling, valve 55 being used to control the flow rate of cold water in exchanger 54.

Such a heat pump 4 serving simultaneously to cool the rolling emulsion and reheat the solution operates in excellent conditions since the rolling process producing the fluid to be cooled and the energy available, and the pickling process determining the demand for energy needed to maintain the temperature of the solution, are simultaneous, and the period of use throughout the year is extensive. Moreover, the temperatures are fairly stable and in a range easy to generate using industrial means.

Finally, in a modern installation, the rolling mill is close enough to the pickling line, which means there is no need to worry about high heat losses from the circuits, which can be heat insulated.

Due to these favorable conditions, a performance coefficient of approximately 3.5 can be obtained for the heat pump, corresponding to a large energy gain.

The hot water circulating in circuit 8 thus supplies the heat energy required to reheat the solution, valve 82 for adjusting the flow rate of the hot water in each exchanger 80 allowing the supply of heat in each reheating circuit 2 to be adjusted in order to adjust the temperature to the desired level according to the position of the corresponding tank in the line.

However, energy requirements may vary, while the heat pump system must function at a fairly stable temperature. This is why several means are provided for adjusting the level of energy supplied to hot water circuit 8.

First of all, it is possible to use a heat pump comprising several compressors 43, 43a, 43b, placed in parallel on the return circuit to the evaporator, and which make it possible to adjust the flow rate of the refrigerating fluid and, consequently, the amount of heat taken from the rolling emulsion, the final temperature of which is adjusted by exchanger 54.

Several energy levels supplied by the heat pump are therefore available, depending on the number of compressors in operation.

However, the working margin around each energy level may not be sufficiently large to flexibly handle variations in energy requirements resulting from changes in production rates.

For this reason, heat pump 4 is advantageously associated with another more conventional heating means so as to provide relatively accurate adjustment of the temperature of the solution in line with requirements. This heating means comprises, for example, at least one exchanger 87 placed on the feed collector 84 through which circulates steam or superheated water, the flow rate being adjusted by a valve 88. It is thus possible, by adjusting exchanger 87, to supply the hot water circulating in circuit 8 with the heat energy which, when added to the energy supplied by heat pump 4, will make it possible to satisfy requirements exactly.

The association of these two heating means will therefore make it possible to adapt at all times to different operating conditions using the most cost-effective means of heating.

Indeed, heat pump 4 will generally provide the greater proportion of the energy required in the most cost-effective way, the steam or superheated water exchanger 87 being used to adjust energy levels in line with requirements, particularly at the time of start-ups, and to adsorb changes the rate of production, for example, when the dimensions of the strip are changed.

Such arrangements therefore not only result in substantial energy savings, but also provide many different ways of adjusting the temperatures of the different circuits in order to cope with all situations in an optimum manner.

To this end, the operation of the different components is advantageously controlled by an automatic regulation system 7 comprising several separate regulators. A brief description of the working cycle of this system will now be given with reference to the diagram in FIG. 2, and to the diagram in FIG. 3 representing the supply of energy provided by the different components.

Curve (b), represented as a solid line, indicates the overall energy requirements which vary as a function of production rates and, for example, changes in the width and thickness of the strip being processed which can be carried out continuously during a given working cycle in this type of installation.

After a prolonged shutdown period of the installation, the solution has cooled down and must therefore be reheated up to the desired temperature of 85° C. Heat pump 4 is then stopped and short-circuited by by-pass 56 whose valve 57 has been manually or automatically opened at the time of the preceding shut-down.

During this period, indicated AB in FIG. 3, the energy requirement, represented by curve (b), increases rapidly. This supply of energy is provided by the steam or superheated water via exchanger 87 and hot water circuit 8.

Of course, a separate circuit could also be used for initial heating of the solution.

Once the solution has been raised in all of the tanks to the desired temperature, the installation can be started up. The temperature of the solution is maintained by the water heated in exchanger 87.

The tandem rolling mill is also in operation, causing the temperature of the rolling emulsion to rise.

This temperature $t_2$, measured at point 75 on recovery collector 51, is set a regulator 74, on which is set on a temperature threshold $T_2$ from which it is possible to recover sufficient energy from the rolling emulsion for heat pump 4 to work.

By-pass 56 keeps heat pump 4 short-circuited as long as threshold $T_2$ has not been reached. Any cooling of the rolling emulsion is then ensured by exchanger 54 alone, its power being adjusted by a regulator 76 on which are set a temperature $T_3$ which must be given to the rolling emulsion before being recycled, and the real temperature $t_3$ of the emulsion measured at point 77 on the recycling collector 52.

When the temperature of the rolling emulsion passes threshold $T_2$ and is therefore judged sufficient for heat pump 4 to be usable, regulator 74 commands the closing of valve 57. The emulsion then passes into evaporator 42 of heat pump 4, which is then ready to operate. When the operator estimates that the operating conditions of the installation are stable, for example at instant B in the diagram, the operator commands the start-up of heat pump 4 and starts up the number of compressors corresponding to operating conditions.

Thus, in the example shown, heat pump 4 comprises three compressors 43, 43a, 43b, supplying at least three energy levels which each constitute a "heel" (a1) (a2) (a3) represented by the dot-and-line curve (a) in FIG. 3.

When the heat pump starts at instant B, the operator starts up the three compressors such that the heat pump supplies a relatively stable energy level (a3) as close as possible to the overall requirement corresponding to curve (b) at the same instant.

Heat pump 4 having taken over and supplying most of the energy required, the steam circuit in exchanger 87 now works only in complement to provide a flexible means of adapting to requirements that may vary according to conditions of production, as indicated by curve (b).

The power to be supplied by exchanger 87 during the period BC is therefore relatively low and is indicated by curve (C1) which, for the period BC, corresponds to the curve (b) minus the energy heel (a3) supplied by the heat pump.

This variable supply of heat is provided by the steam or superheated water exchanger 87 whose power is exactly adapted to requirements thanks to valve 88 controlled by regulator 70.

To this end, temperature $t_1$ of the hot water measured at the inlet of condenser 44, i.e., downstream of exchangers 80 for heating the solution, is set on an input of regulator 70. Temperature $t_1$ is compared with an optimal temperature T1 set on another input of regulator 70.

As long as the energy level (a3) supplied by the heat pump remains below the requirements (b), regulator 70 controls the adjustment of the steam flow rate in exchanger 87 so as to obtain the additional energy (c) required, such that the sum of the quantities of heat supplied by heat pump 4 and exchanger 87 corresponds to the overall energy requirement represented by curve (b).

If energy level (a3) supplied by heat pump 4 alone becomes greater than the requirements (b), as indicated at instant C on the diagram, the measured temperature $t_1$ exceeds optimal temperature T1. Regulator 70 then controls the shutting down of one of the compressors 43 in order to reestablish the balance, and the energy supplied by the heat pump falls to level (a2). The steam flow rate in exchanger 87 is then immediately increased in order to bring the energy supplied back up to the required level, as indicated by curve (c2) during period CD.

The hot water circulating in circuit 8 constitutes the heat source on which each branch-connected exchanger 80 can draw according to requirements in order to maintain the desired temperature of the solution. To this end, the hot water flow rate in the heating circuit of exchanger 80 is adjusted by a valve 82, controlled by a separate regulator 72, and on which are set the reference temperature Tn which must be maintained in the considered tank and the temperature of the solution measured at point 73 on the corresponding evacuation pipe 23.

The amount of heat recovered from the rolling emulsion and, consequently, the temperature of the emulsion at the outlet of evaporator 42, varies according to the operating conditions set for heat pump 4, and the cooling dose of the emulsion may not be sufficient.

Exchanger 54, controlled by regulator 76, therefore provides additional cooling so that the temperature measured at point 77 on recycling collector 52 falls to the level $T_3$ desired.

Preferably, the steam or superheated water generator supplying exchanger 87 and heat pump 4 at its maximum production are designed so that each is capable of alone supplying the heat energy required for normal conditions of production.

As a result, if the energy requirement drops rapidly, when slowing down the production line, for example, the regulation system commands the complete shut-down of heat pump 4. Exchanger 87 alone then maintains the water circulating in circuit 8 at the desired temperature, and alone supplies the required energy level (c3). This level therefore corresponds to the overall requirement (b) as indicated in FIG. 3 for the period DE.

In the same way, the rolling emulsion is cooled by exchanger 54 alone.

The installation described above therefore makes it possible to adapt the production of heat to requirements prevailing at all times and to choose the most cost-effective heat source.

Under normal operating conditions, the rolling emulsion recovered in the tandem rolling mill is generally brought into evaporator 42 at approximately 50° C. where it can be cooled to a temperature of approximately 45° C. The heat energy recovered in condenser 44 and transferred to the hot water circulating in circuit 8 makes it possible to reheat the pickling solution circulating in each exchanger 80 from approximately 80° C. to approximately 85° C.

It can therefore be seen that the invention provides a multitude of possibilities for adapting to all working conditions through the optimal use of heat pumps so as to reduce energy consumption to a minimum in each case.

While the drawings show only pickling tanks, similar heating means could be used for rinsing and drying the strip after pickling.

Other means of conventional heating could also be used in association with the heat pump, providing they allow accurate adjustment of the amount of heat supplied.

Moreover, in the embodiment just described, the thermal energy recovered by the heat pump is transferred to the acid solution by an intermediary circuit of heat exchanging fluid such as water, which authorizes use of a relatively conventional heat pump and exchangers that are easy to produce industrially and which may already be available on the market.

It may be advantageous, however, to simplify the system by removing the intermediary circuit, the heat recovered in the rolling fluid then being supplied directly to the acid solution.

The circuit of such an installation is shown by way of example in FIG. 4.

Here, the hot water circuit 8 has been removed accordingly, with each exchanger 80 placed on a circuit 2 for reheating the solution in the corresponding tank and directly using the refrigerating fluid of heat pump 4 as a heat source.

Exchangers 80, which each constitute one of the condensers 46, 46a, 46n of heat pump 4, are connected in parallel, respectively, to a collector 47 supplied by compressor(s) 43, and to a return collector 48 connected to the input of pressure-relief valve 45, the two collectors 47, 48 thus constituting the two branches of the refrigerating fluid circulation circuit.

The refrigerating fluid therefore directly supplies the heat recovered from the rolling emulsion in evaporator 42 of heat pump 4 to the acid solution circulating in each condenser 46.

In this case also, heat pump 4 supplies a relatively stable amount of heat and is associated with another more conventional heating means, such as a circuit 6 carrying steam or superheated water produced by a boiler 60.

Each pickling tank $A_1$ (An) is then associated with two reheating circuits, respectively a first circuit 2 (2n), passing via a condenser 46 (46n), of heat pump 4, and a second circuit 20 (20n), passing via an exchanger 61 (61n), branch-connected onto steam circuit 6.

Each tank is associated with a regulator 70 (70n) on which is set the temperature of the solution measured at the outlet of the tank or corresponding storage tank, and a reference temperature Ti.

As before, the optimal temperature T1 of the heat exchanging fluid, i.e., of the refrigerating fluid, is determined, and the temperature t1 of this fluid is measured downstream of condensers 46 (46n).

After a prolonged shut-down, the solution is heated prior to start-up by exchangers 61 (61n) through which steam passes. As soon as the correct temperature is reached, the installation is started up and the temperature of the solution is maintained solely by exchangers 61 (61n).

The rolling emulsion is cooled by exchanger 54, with circuit 5 being made up and working in the way previously indicated with reference to FIG. 2.

When the installation has reached stable operating conditions, the operator starts up heat pump 4 which takes over from circuit 6 to supply most of the energy required. The temperature of the solution in each tank is therefore maintained by condensers 46 (46n), with regulator 70 (70n) adjusting the flow rate of refrigerating fluid in each condenser 46 (46n) according to the temperature Tn to be obtained in the tank. If this temperature cannot be reached by the condenser alone at maximum flow rate, regulator 70 commands the starting up of circuit 20 and the adjustment of the corresponding exchanger 61 in order to obtain the required energy level.

Conversely, if the energy absorbed by condensers 46 (46n) is insufficient, temperature t1 of the refrigerating fluid becomes too high, causing regulator 70 to command the shutting down of one or more compressors.

The system described above has the advantage of simplicity, since the acid solution is heated directly by the heat pump. However, condensers capable of withstanding acid, one the one hand, and the pressure of the refrigerating fluid on the other. Such condensers can be produced from graphite, for example.

To reduce the overall energy consumption required to heat and maintain the solution at the desired temperature, it is also possible to act on the strip itself, just before it passes into the first tank $A_1$.

For this purpose, it is advantageous to use the arrangements shown, by way of example, in FIGS. 5 to 8.

FIG. 5 schematically shows the upside section of a pickling installation, placed after located downstream of a strip accumulator C that is generally arranged under the tanks. On leaving accumulator C, the strip P passes to the upper level and into a scale breaker designed to prepare the separation from strip P of oxide particles or other particles left on the two faces of strip P following hot rolling and/or storage.

Normally, strip P penetrates into the first tank $A_1$ of the pickling installation immediately after leaving the scale breaker D by passing on a first threshold or deflector roll 13 to form a loop 12 that dips into the solution bath 11.

According to the invention, a means 3 for preheating the strip is arranged on the strip's path between the scale breaker D and the first pickling tank.

This preheating means 3 comprises several electromagnetic inductors 31, 31a, 31b, extending either side of the strip across its whole width, each being associated with an inverter connected to an electrical power source such as a power transformer connected to the mains supply.

The inductors are of the axial flux type.

In a preferred embodiment, shown schematically in FIG. 7, each inductor assembly 31 comprises a coil in the form of a flat ring completely surrounding strip P, with strip P forming a magnetic core and the assembly behaving as an inductive resistance with a moveable armature.

Each inductor assembly is supplied with alternating current whose frequency can be adjusted by the associated inverter. A magnetic induction axial flux is therefore created in the plane of the strip P over its whole transversal section, and is directed either in the direction, of travel of the strip or in the reverse direction depending on the direction of the electrical supply and the movement of the strip P causes induction currents to form which flow in either direction throughout the entire thickness of the strip 2 perpendicularly to the direction of travel, causing the temperature of the strip to rise, the temperature being adjustable according to the speed of travel by acting on the supply of electricity to the inductors.

In the embodiment shown in FIG. 5, inductors 31, 31a and 31b are located in sequence in the horizontal direction of travel of the strip. In an existing installation, for example, they can be placed above the input accumulator in place of the first pickling tank which is accordingly removed, pickling beginning in the tank previously in the second position.

Pairs of supporting rolls 16 are placed on either side of each inductor assembly 31 to support the strip 2 and to keep it sufficiently taut.

Due to such an arrangement, the strip 2 leaving the scale breaker D can be directly heated as it passes through preheating device 3 by magnetic induction up to the temperature required for pickling, i.e., between 75° and 85° C. Strip P will therefore already be at the temperature of the bath when it arrives at the first pickling tank 1, and will not therefore cool the bath as was previously the case. Pickling therefore immediately starts at the correct temperature. As a result, for equivalent productivity, the total length covered by the pickling tanks can be reduced. This is why, in an existing installation, the first pickling tank can be dismantled and replaced by a preheating device 3.

However, the arrangement shown in FIG. 8 is also possible with the inductors 31 being arranged in a vertical direction, as will be described hereinbelow.

By heating the strip before it enters the bath, the invention makes it possible not only to remove a major cause of heat losses, but also to add a certain quantity of heat to the pickling solution. The temperature of the strip on entering the first tank can in fact be adjusted to a level sufficient to compensate for other heat losses incurred by evaporation and radiation, and thus maintain the temperature of the bath.

It is particularly advantageous to use, as a complementary heating means, a heat pump which supplies most of the energy required to maintain the temperature in each tank, and inductors which act directly on the strip and whose effects can be precisely adjusted to allow rapid adjustments, for example, in the case of a change in dimensions.

Indeed, given the short response times, temperature regulation can be performed, for example, in the manner shown in FIG. 6 which schematically shows the preheating device 3 and the first 2 tanks $A_1$, $A_2$ of the pickling line together with their reheating circuits 2, (2').

As shown in FIG. 6, each reheating circuit 2 (2') comprises a heating means such as an exchanger 80 connected to a heat exchanging fluid circulating circuit 8 via a feed pipe 81 and an evacuation pipe 83 which are branch-connected, respectively, to an upside collector 84 and a downside collector 85 connected to a heating system 40 comprising, advantageously, a heat pump, as described earlier.

The assembly is associated with a regulation system comprising, for each reheating circuit 2 (2'), an individual regulator 72 (72') which receives on one of its inputs a signal corresponding to the reference temperature T1 in the tank under consideration, and on a second input a signal corresponding to the temperature in the same tank, measured at point 71 on the sampling pipe 23, on the upside of the exchanger 80.

Depending on the measured difference, the regulator 72 commands the opening or closing of the valve 82 which adjusts the flow rate of the fluid in exchanger 80.

The preheating device 3 is also associated with a regulator 86 on which the different parameters to be considered are set, and in particular:

the speed of travel of the strip P, the thickness and width of the strip P, the ambient temperature, the temperature of the strip measured at the output of the preheating device 3, the temperature T1 to be maintained in the first pickling tank 1.

The regulator 86 controls the supply of electrical power to the different inductors 31, 31a, 31b according to these different parameters in order to raise the temperature of the sheet P to at least the temperature of the bath in the first pickling tank $A_1$ and even, possibly, to a higher temperature in order to compensate for heat losses.

Due to the flexibility and very rapid response time of such an arrangement, it is possible to reduce to a minimum the heat added to maintain the temperature in the different tanks.

It will be noted that the passage of the strip through inductors 31 helps detach oxides, particularly because of the expansion that results from the abrupt increase in temperature of the strip. Another important advantage of the invention resides in the fact that the frequency of the electricity supply can be adjusted so as to produce vibrations in the strip between the pairs of rolls 16. The magnetic effect can also facilitate the detaching of certain oxides.

Indeed, the movement of the strip P in the magnetic flux creates not only induction currents, but also forces in a plane perpendicular to the strip, the direction of which reverses at a frequency corresponding to that of the electric supply, and by acting on that frequency it is possible to give preference to either the heating by induction or the vibration, or to use a combination of both effects.

For this reason, according to another particularly advantageous improvement, at least one of the inductors is adjusted so as to cause strip P to vibrate as it passes in such an inductor, with intensity and frequency being individually adjustable.

Such an arrangement is shown schematically in FIG. 8.

Preferably, the inductors 31' which are used to initiate vibration in the strip are placed one above the other between two rollers 13 (13'), therefore defining a vertical path for the strip so as to facilitate the evacuation of detached particles.

The electrical supplies to the different induction assemblies are individually regulated according to their position. Thus, in the direction of travel, the strip P can advantageously, first pass through an exciter assembly 31'$a$ which serves to initiate vibration in the strip, and then into one or more superposed assemblies 31'$b$ which maintain vibration in the strip, and lastly into a damping assembly 31'$c$ which damps the vibrations in the strip before it enters into the first tank $A_1$.

This device is placed immediately downstream of the scale breaker D. Indeed, to facilitate pickling, the scale breaker splits the oxide layer and causes particles to form, some of which immediately detach, while others remain partially adhered to the metal strip. Causing the said strip to vibrate makes it possible to completely detach a large proportion of these particles, it being possible to adjust the amplitude and frequency of vibration according to the transversal section of the sheet and the amount of scale on it.

The assembly is integrated into a case 36 which makes it possible to evacuate the detached particles through a dust suction and recovery circuit 37.

It is therefore possible to detach a significant proportion of impurities from the strip, in the order of ¼ to 1/5, before it even arrives in the first tank $A_1$, and to evacuate them in the form of dust.

This significantly reduces the amount of dust carried into the bath, particularly into the first tank, and this again benefits the pickling action. Moreover, it simplifies the filtering of the acid in the recycling circuit, with the lower rate facilitating regeneration.

In a general way, it is possible, by adjusting the electrical supplies differently in each inductor assembly, to give preference to either bringing about vibration or preheating, or a combination of both effects. Moreover, it is possible to associate in the same case induction assemblies for first vibrating and then preheating the strip P.

The exchangers 80 (80') for maintaining the temperature of the tanks can be of different types. Steam exchangers are normally simpler to use since steam circuits are often available in metallurgical installations. Alternatively, simple electrical element type heating elements designed to withstand the corrosive effect of acid, made from graphite, for example, could be used.

In operation, the calorific energy that the steam exchangers 80 (80') or heating elements must supply is fairly low since it is only necessary to compensate for the heat losses in the tanks and different circuits, and which are in addition lagged. This is why the use of a heat pump is particularly advantageous. In contrast, relatively powerful means must be available in order to quickly raise the temperature of the solution from ambient temperature to the temperature required for pickling, for example, following a fairly long shut-down period.

Each reheating circuit can therefore be fitted with low power exchangers for the purpose of maintaining temperature, and more powerful exchangers with parallel-mounted heating elements for rapid heating following a shut-down.

However, in order to reduce the number of exchangers required, it may be preferable to connect all the tanks to a special circuit 9 fitted with one or more high-power heating elements 91 and a circulation pump allowing the temperature of the solution to be raised quickly.

We claim:

1. A process for heating and maintaining the temperature of a pickling solution in a metal strip treatment installation comprising a cold rolling mill including at least one rolling stand comprising a plurality of rolls and means for spraying rolling fluid onto the rolls and strip, and a pickling line made up of a series of tanks filled with a pickling solution and through which the strip is continuously passed, each tank being associated with means for heating the solution, said process comprising the steps of (a) heating said pickling solution and starting and operating said installation in stable fashion;

(b) maintaining said pickling solution in each tank at a required temperature through the cooperation of a heat pump supplying a relatively stable energy level and an additional heating means supplying an additional level of energy that can be permanently adjusted in order to adapt, at all times, to variations in overall energy requirements resulting from changes in production conditions; and (c) cooling said rolling fluid simultaneously by said heat pump and an additional cooling means allowing the temperature of said rolling fluid to be reduced to a desired level before being recycled.

2. The process according to claim 1, wherein, after a shutdown of said installation, said pickling solution is first heated to a pickling temperature by said additional heating means, then the installation is started, the temperature of said pickling solution then being maintained by said additional heating means and said rolling fluid being cooled by said additional cooling means, and, once the installation is operating in relatively stable operating conditions, said pump is actuated to take over both cooling of said rolling fluid and heating of said pickling solution.

3. The process according to claim 1, wherein heat recovered by said heat pump is transferred to a heat exchange fluid circulation circuit on which a plurality of exchangers are branch-connected, each exchanger being associated with a circuit for reheating said pickling solution in one of said tanks, and wherein the heat transfer is adjusted by a regulation system comprising a regulator which selects operating conditions of said heat pump according to the temperature of the heat exchange fluid downstream of said exchangers, and, for each exchanger, a separate regulator which adjusts the flow rate of the heat exchange fluid in said exchanger in order to maintain the temperature of said pickling solution in the circuit at the level desired according to the position of the tank in the line.

4. The process according to claim 1, wherein said heat pump comprises a closed circuit circulating refrigerating fluid which flows through an evaporator, at least one compressor, at least one condenser and a pressure-relief valve, said process comprising the steps of connecting said evaporator to a circuit for circulating rolling fluid recovered from said rolling mill in order to cool said rolling fluid by heat exchange with said refrigerating fluid, and connecting said condenser to a circuit for circulating said pickling solution for heating said pickling solution by heat exchange with the refrigerating fluid of said heat pump.

5. The process according to claim 4, wherein each tank of said pickling line is associated with a first reheating circuit circulating the solution contained in said tank and comprising a heat exchanger constituting said means for heating said pickling solution in said tank, said process comprising the step of connecting said heat exchanger to a circuit circulating a heat exchanging fluid passing said heat pump in order to heat said heat exchanging fluid.

6. The process according to claim 5, wherein said circuit circulating said heat exchanging fluid comprises a feed collector connected to an outlet of said condenser of said heat pump, and a return collector connected to an inlet of said condenser, said process comprising the step of connecting each exchanger to said feed collector via an inlet pipe fitted with a valve and to said return collector via an outlet pipe.

7. The process according to claim 6, comprising the step of connecting an exchanger constituting additional heating means to the feed collector of said circuit circulating the heat exchanging fluid.

8. The process according to claim 5, comprising the steps of using the refrigerating fluid of said heat pump as heat exchanging fluid for heating said pickling solution, and branch-connecting each heat exchanger associated with each tank to a feed collector and to a return collector connected, respectively, to the outlet of said compressor and to the inlet of said pressure-relief valve of said heat pump, said heat exchangers each constituting a condenser of said heat pump.

9. The process according to claim 8, comprising the step of connecting each tank via a second reheating circuit to a heat exchanger associated with heating means.

10. The process according to claim 6, comprising the step of adjusting the heat transfer by a regulator for maintaining the temperature measured on the return collector of the heat exchange fluid at an optimal level by action at least on the operating conditions of the heat pump.

11. The process according to claim 6, wherein the heat pump comprises several compressors, said process comprising the step of modifying the operating conditions of the heat pump by supplying several levels of energy, said compressors being started up selectively by the regulator according to requirements.

12. The process according to claim 10 or 11, wherein said circuit for circulating the heat exchanging fluid comprises an additional exchanger, said process comprising the step of adjusting the amount of heat supplied by said additional exchanger according to the operating conditions of the heat pump in order to maintain the temperature of said fluid at the desired level.

13. The process according to claim 5, wherein each heat exchanger associated with each tank is associated with a regulator for adjusting the flow rate of the heat exchanging fluid in said heat exchanger, said process comprising the step of maintaining the temperature of the pickling solution in each tank at a reference temperature set on a corresponding regulator, said reference temperature depending on the position of the corresponding tank in the line.

14. The process according to claim 13, wherein each tank is connected to a second heat exchanger associated with heating means, said process comprising the step of adjusting the amount of heat supplied by said second heat exchanger according to the temperature to be maintained and the amount of heat likely to be supplied by the exchanger of said first tank associated with said tank.

15. The process according to claim 1, comprising the steps of cooling the rolling fluid downstream of said heat pump down to a reference temperature and recycling the cooled rolling fluid back to said cooled rolling mill.

16. The process according to any one of claims 1 to 3, comprising the step of preheating the strip by electromagnetic induction immediately before the strip enters into the first tank, by means of at least one axial flux inductor, placed on the path of the strip upstream of the first pickling tank in relation to the direction of travel, said inductor extending over the entire width of the strip and on each side of the strip.

17. The process according to claim 16, comprising the step of adjusting the electrical supply feeding said at least one inductor according to at least one of different parameters considered for heating the strip, such as speed of travel, thickness and width of the strip, ambient temperature, temperature of the strip at the outlet of the preheating means and the temperature of the solution in the first pickling tank.

18. The process according to claims 16, comprising the steps of placing at least one axial flux induction assembly on the path of the strip before it enters into the first pickling tank, said induction assembly extending over the entire width of the strip, adjusting the electrical supply feeding said induction assembly according to the nature and dimensions of the strip so that the strip is caused to vibrate in such a way that at least some oxide and impure particles deposited on the strip are detached, and evacuating the detached particles.

19. The process according to claims 18, wherein each inductor assembly comprises a coil in the form of a flat ring completely surrounding the strip and associated with an inverter connected to an electric power source.

* * * * *